Nov. 26, 1968 C. LING 3,413,482
ATOMIC ABSORPTION SPECTROPHOTOMETRY
Filed March 2, 1967
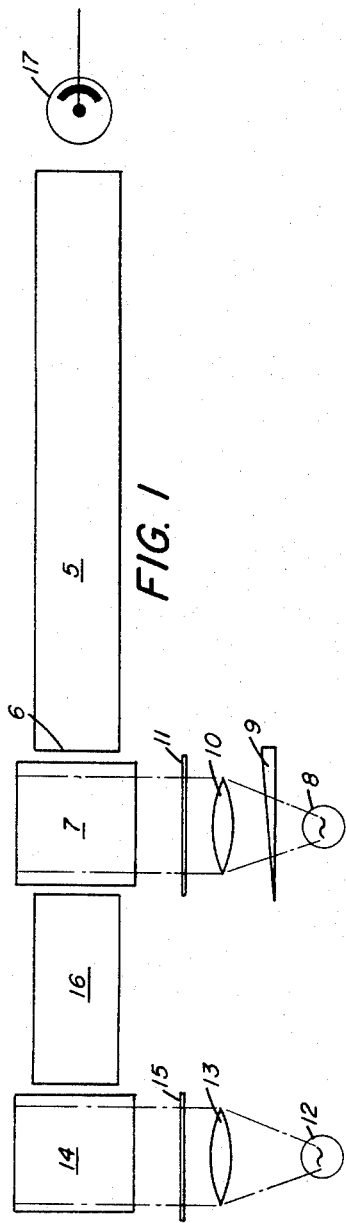
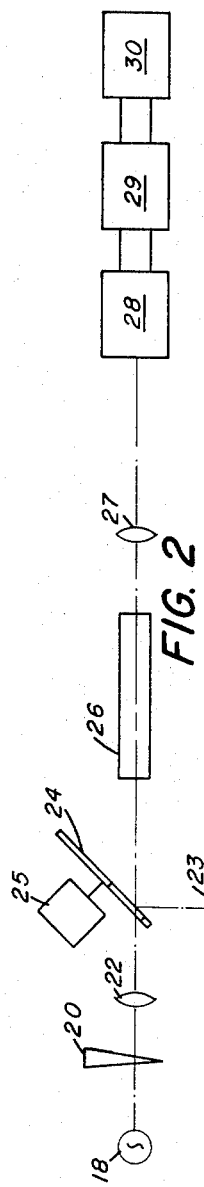
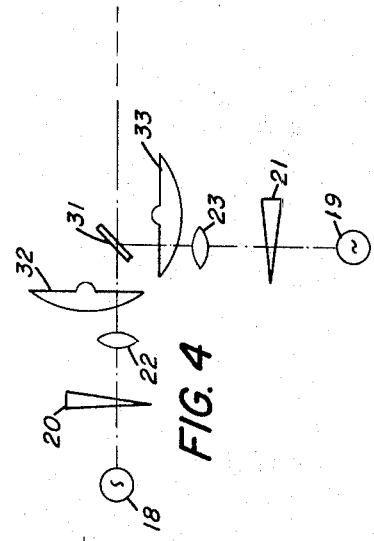
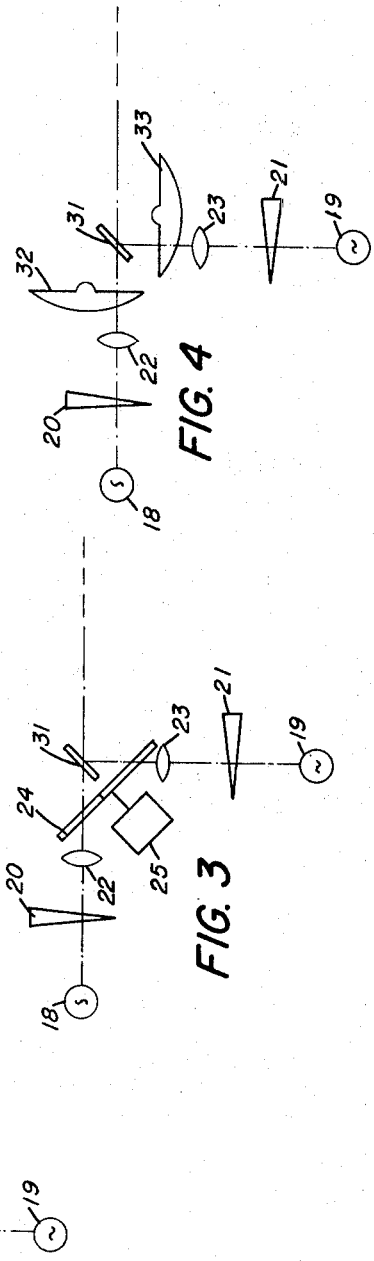
CLEMENT LING
INVENTOR.
BY Robert F. Crocker
ATTORNEY United States Patent Office 3,413,482
Patented Nov. 26, 1968

3,413,482
ATOMIC ABSORPTION SPECTROPHOTOMETRY
Clement Ling, North Baldwyn, Victoria, Australia
Filed Mar. 2, 1967, Ser. No. 619,991
12 Claims. (Cl. 250—226)

ABSTRACT OF THE DISCLOSURE

Spectrophotometric apparatus for detecting a particular element in a sample by atomic absorption effects in the presence of impurities which cause non-atomic absorption tending to mask the atomic absorption. The intensity of monochromatic light from a spectral "line" source corresponding to a known atomic resonance frequency of the element is compared, after both have passed through the sample, with that of a reference beam of light of preferably broader, overlapping, spectral characteristics, the percentage absorption of which by the impurities is substantially the same as that of the light from the line source, but the transmitted intensity of which is relatively insensitive to the presence of the element itself.

---

This invention relates to atomic absorption spectrophotometry and concerns an apparatus and method for measuring atomic absorption as distinguished from absorption due to other causes.

In atomic absorption spectrophotometric analysis, use is made of the fact that a vapour consisting exclusively of atoms of a particular element absorbs significant quantities of energy only from electromagnetic radiation (referred to herein generically as "light") in a very narrow frequency band centred about or including a value characteristic of the element under consideration. This value is generally referred to as the "resonance frequency" of the element, and the corresponding wavelength, as the "resonance wavelength." Atomic absorption is thus to be distinguished, in particular, from molecular phenonmena in which molecules absorb resonance frequencies in bands which may coincide with or overlap certain atomic resonance frequencies. Certain molecular species such as sulphur dioxide, acetone and toluene absorb strongly in a broad frequency band overlapping the mercury resonance line vis. 2537 A. and thus any such molecules existing in a sample of vapour being analysed may respond to and absorb energy from light of frequency equal to the resonance frequency of mercury atoms, thus giving rise to effects which mask the absorption due to purely atomic causes.

It is also known that light may be scattered by particulate matter, thus giving rise to further side effects tending to mask the true atomic absorption. Known techniques use a light source in the form of a hollow cathode lamp or an atomic spectral "line source" emitting light having the frequency of a resonance line of an element. For the purposes of this specification light is designated "monochromatic" or as being of a specific frequency (or wavelength) if it is concentrated in a narrow frequency (wavelength) band including the frequency (wavelength) specified. It will be evident that such light may include frequencies outside the spectral bandwidth of the monochromator or other detector used.

Light from such a source of frequency equal to the resonance frequency of the atomic vapour under analysis is passed through the vapour and the transmitted light received by a monochromator or other detector which is generally adjustable as to dispersion and the range of frequencies detected. The monochromator isolates the resonance line from other frequencies and the intensity of the fraction thus isolated is measured and/or recorded in any suitable manner such as by a photomultiplier/amplifier system. By comparing the intensity with the corresponding value in the absence of vapour, a measure can be obtained in a relatively simple fashion of the percentage absorption due to atoms of the kind under investigation.

Such known techniques however have no means of distinguishing between atomic and non-atomic absorption, and it is an object of this invention to provide a method of measuring accurately the atomic absorption of a particular element in a gaseous sample which may be in the free state or contained in a vessel, by appropriately accounting and correcting for nonatomic absorption in the sample.

Another object is to provide a simple and convenient apparatus for carrying out such a method, the apparatus being non-bulky, easy to handle and operate and relatively inexpensive.

For the purposes of this specification, "atomic absorption" means absorption of light at a frequency which is a characteristic of the kind of atom considered. Such of the total absorption as may be also found at other frequencies will be designated "non-atomic" and from the foregoing it will be understood that the non-atomic absorption may be due to such entities as molecules and/or particles in the optical path.

According to the present invention, apparatus for determining the atomic absorption due to an element in a gaseous sample is characterised by a first source capable of emitting monochromatic light of frequency substantially equal to the resonance frequency of the element, a second source capable of emitting light having such a frequency distribution of energy that its total intensity within a detection frequency range is not sensibly attenuated by the atomic absorption and is attenuated by the non-atomic absorption to substantially the same extent as is the intensity of the light of the first source, the total intensities of the respective sources within the detection range being substantially equal, means for passing radiation from the source through the sample simultaneously or alternately according to a predetermined time schedule, and detecting means for comparing the intensities of the sources with that of the transmitted light and deriving therefrom a measure of the atomic absorption in the sample.

The intensities of the sources are made to be equal so that the difference between the transmitted intensities affords a measure of the amount of atomic absorption as distinguished from non-atomic absorption. If the absorption were entirely due to non-atomic causes, the diminution of intensity of the light transmitted from each source would be substantially the same, tending to a situation of zero difference between the transmitted intensities. If however, considering the other extreme, the gas consisted entirely of atoms of the kind under analysis, light from the first source would be absorbed whereas light from the second source would not suffer any significant attenuation. The difference between the transmitted intensities in this latter case would, therefore, be relatively large.

It is preferred that the sample be irradiated according to a time schedule which admits light alternately from the first and second sources. If this irradiation process is substantially continuous i.e. with no dark period between successive "flashes," and if the intensities of the sources are equal, then a D.C. signal will result and subsequently zero signal will be shown on an alternating current photoamplifier. This is due to the fact that an alternating current photoamplifier rejects any D.C. signal and accepts only alternating current signal.

However in the presence of atomic absorption, there will be a significant difference between the intensities transmitted from the respective sources and this will lead to a time-variation in the intensity of light received by the detector. A non-zero signal will then appear at the output of the AC amplifier, the amplitude of this output signal depending on the amount of atomic absorption. The frequency of the output signal will depend upon the apparatus itself and will depend on the total period or time-cycle of the schedule whereby radiation from the respective sources is passed through the sample.

It will be appreciated that the second of the two sources provided by my invention may be either monochromatic (i.e. a "line source") and of frequency differing from that of the first source, but still within the detection range e.g. the spectral slit-width of a monochromator, or it may represent a band of frequencies (i.e. it may be a "continuous source" over the spectral bandwidth of the detection range, or other part thereof and this "continuum" may include the frequency of the first source).

In a practical embodiment of the invention our apparatus provides suitable means for optically aligning the two sources and equalizing or otherwise suitably adjusting their effective intensities. The detector advantageously includes a monochromator capable of accepting wavelength over the detection range. Furthermore the detector advantageously includes means for indicating the monochromator output due to the respective sources and for measuring this output as a percentage value and/or absorbance unit or in any other appropriate manner.

The second source is advantageously such that it may be a continuous source which emits frequencies over the detection range (e.g. the spectral slit-width) including the frequency of the first source, or it may be a line source which is capable of emitting frequencies other than the frequency of the first source but within the detection range.

Since mercury is the element of primary interest in this regard, the present invention will be described with special reference to mercury. It is to be understood, however, that the invention envisages the determination of atomic absorption due to other elements.

But in order that the invention may be better understood reference will not be made to the accompanying drawings which are to be considered as part of this specification and read herewith. In the drawings:

FIGURE 1 is a schematic diagram of a preferred form of apparatus in accordance with this invention;

FIGURE 2 is a schematic diagram of another embodiment of apparatus in accordance with this invention;

FIGURE 3 is a schematic diagram of a further embodiment involving a measuring circuit similar to that incorporated in the apparatus shown in FIGURE 2;

FIGURE 4 is a schemtic diagram of yet another embodiment requiring a measuring circuit different from that involved in the apparatus represented by FIGURES 2 and 3.

Referring to FIGURE 1 in more detail, there is shown a cell 5 which may be of substantially cylindrical formation and of which at least the end walls are transparent to the frequencies emitted by the sources. Cell 5 contains a gas sample including mercury vapor, and it is desired to determine the atomic absorption due to mercury in the sample.

The first source is adapted to irradiate the sample through the transparent left hand end wall 6 of cell 5, and consists of a high-vacuum mercury resonance lamp including a radiant energy generating chamber 7 containing mercury vapor. Chamber 7 is capable of being irradiated by means of an exciting source 8 with which is associated an optical attenuator 9 and a lens system represented by 10 providing a substantially parallel beam. Shutter 11 is capable of being opened and closed according to the predetermined time schedule. Upon opening shutter 11, light from source 8 irradiates the mercury vapour in chamber 7 to cause re-radiation by the mercury atoms at the atomic resonance frequency. This re-radiation constitutes the first source of light used to irradiate the sample in cell 5.

The light emitted by the second source is derived from a preliminary exciting source 12 from which light passes through lens system 13 into resonance lamp 14, the light passage being under control of shutter 15 operated according to the predetermined time schedule. Resonance lamp 14 not only contains mercury vapour but also constitutes spectral "broadening" means by reason of its containing also a quantity of an inert gas such as spectrascopically pure argon at one atmosphere. Normally, lamp 14 would emit radiation at the resonance frequency of mercury, but due to the presence of the inert gas there is obtained a Lorentz spectral broadening effect which widens somewhat the frequency distribution about the resonance frequency of mercury.

Light is transmitted from lamp 14 to filter means comprising a cell 16 containing mercury vapour and nitrogen. Such may be obtained by introducing a drop of mercury into one atmosphere of nitrogen. The mercury vapour substantially completely absorbs the resonance frequency of mercury and light transmitted to the right from cell 16, and from which the resonance frequency has been substantially completely absorbed, is now substantially insensitive to mercury vapour in cell 5, and constitutes the "second source" used to irradiate the gas sample in cell 5. Preferably the light transmitted by the filter means is directed through radiant energy generating chamber 7 prior to passing through the sample in cell 5, thereby tending still further to diminish any residual components at the resonance frequency of mercury.

It will be seen that light enters cell 5 in a direction at right angles, or at some other substantial angle, to the direction or directions in which light is received by chambers 7 and 14 from the respective excitation sources 8 and 12. This minimizes the possibility of light having undesirable frequencies (e.g. direct light from 8 or 12) entering cell 5.

After traversing cell 5 the light passes through the transparent right hand end wall to a photomultiplier 17. The signal from each source is allowed to pass through cell 5 individually by means of shutters 11 and 15. The "broadened" resonance line obtained by the second source measures only non-atomic absorption, while the sharp resonance line afforded by the first source, measures the sum total of atomic and non-atomic absorption.

The correction for non-atomic absorption in this system is simply achieved by increasing the EHT to the photomultiplier until the signal from the broadened resonance lamp only reads 100%. The signal from the sharp resonance lamp subsequently will then read atomic absorption in percent only. It will be clear that the apparatus can readily be adapted for use by obtaining a "null" measurement.

The form of invention illustrated in FIGURE 1 i.e. in which the second source is a "broadened resonance line," does not necessitate a monochromator or similar device, and such apparatus can therefore be made in a sufficiently compact and portable form for use in such fields as mineralogical exploration or atmospheric monitoring.

It was found that the ordinary low-pressure mercury arc lamp is satisfactory as an exciting source for both lamps, 7 and 14. Further, by suitable optical arrangement it is possible to excite both lamps 7 and 14 with one exciting source.

Referring now to FIGURE 2, 18 and 19 indicate the sources, one of which is a "continuous" source (e.g. hydrogen lamp) and the other an atomic spectral line source (e.g. a mercury arc lamp). The intensity of radiation from the sources may be adjusted by means of an optical attenuator 20, 21 which is used to balance the intensity of the radiation from the two sources. The two beams are collimated by means of the lenses 22, 23 and the collimated beams intersect at an angle (not necessarily at right angles to each other). A chopper-mirror 24 is placed so that it bisects the angle formed by the two collimated beams. The beam from source 19 may then be reflected by the mirror 24, so that the reflected beam follows the same path as that from the source 18.

The mirror-chopper or reflector-chopper 24 consists of alternate mirror sectors (or any reflector sectors such as transparent plane quartz) and transparent sectors both of the same angular dimension. The mirror-chopper may be made of any number of sectors, and is driven by a constant-speed motor 25, which together with the number of sectors of the mirror-chopper determine the frequency with which each collimated beam is chopped. The resultant beam of radiation traversing the atomic vapour 26, now consists of alternately continuous and line radiation which when matched becomes a D.C. signal. The matching of the beams is achieved by situating the sources at the focal points of the lenses and aligning the geometry of the two collimated beams by mechanical movement of the sources (vertically and horizontally with respect to the direction of the collimated beam); the balancing of the respective energies of radiation is achieved by the optical attenuator which needs only to attenuate the stronger source.

The balanced mixed beam is focussed by the lens 27 on the entrance slit of the monochromator 28 which isolates the desired resonance line from the atomic spectral line source and transmits the continuous source at the same wavelength with a bandwidth determined by the dispersion and the slit-width of the monochromator.

The radiation emerging from the monochromator falls on a photoelectric detector (e.g. a photomultiplier) the output of which is amplified and rectified by an A.C. amplifier and rectifier 29, which has a frequency response to the modulated beam and is not responsive to the D.C. signal. The rectified output of the amplifier is measured by a meter and/or a recorder 30.

The output of each source may be measured by the obscuration of the other. Any imbalance of the intensity of the sources will also result in an output of the amplifier.

When the mixer beam passes through an atomic vapour, only the resonance line of the line source is sensibly attenuated and an output of the amplifier will therefore be indicated. As is known, the magnitude of the output is then a function of the concentration of the atomic vapour. The output of the amplifier is in percentage absorption only if the intensity of the continuous source remains 100%. This will be so only if the atomic vapour contains no non-atomic absorbing matter.

When the balanced mixed beam traverses only non-atomic absorbing matter, both radiations will be attenuated equally and no output will be indicated on the amplifier. When atomic vapour is also present then the amplifier will indicate an output. This output may be registered as a true percentage absorption providing the D.C. level is re-adjusted to 100%. This may be achieved by obscuring the line source and adjusting the signal to read 100% on the amplifier by increasing the amplifier gain or the photomultiplier voltage.

Alternatively, the output from the continuous source may be compared with a reference voltage and made to drive a closed loop servo-amplifier which continuously maintains the 100% level so that the subsequent reading is a true percentage absorption due to the atomic vapour.

FIGURE 3 represents an alternative arrangement of the chopper, reflector-transmitter of the two collimated beams. The numeral 31 indicates a reflector-transmitter which transmits a beam from source 18 and reflects a beam from source 19. The reflector-transmitter may be a prism, any geometrically-shaped mirror (such as a hemisphere or parabola) with a central aperture, a plane annular mirror with a central aperture, semi-transparent plane quartz, or a transparent plane quartz. The numeral 24 indicates a motor-driven chopper which consists of any odd number of sectors and which chops the two collimated beams alternately. The advantage of this system is that it is less critical in the optical arrangement.

FIGURE 4 represents an alternative apparatus for discriminating the intensity of the two sources. The sources are transmitted and reflected in the same manner as described in FIGURE 3. The sources are individually modulated at different frequencies either by choppers 32, 33, or electronically. The modulated signals are discriminated at the amplifier by narrow pass-band filters. The chopper frequencies are chosen so that any harmonic of the lower frequency signal will be outside the pass-band of the filters. The modulated signal from the continuous source is then monitored to 100% signal level and measured as described before. The advantages of this system are that monitoring of intensity of the radiation of the continuous source is not intermittent and also the simplicity of the optical system. Further, if a recorder is used as a measuring unit, the signal from the continuous source may be compared directly with the reference voltage in the recorder.

In each case, non-atomic absorption may also be measured as a percentage value directly from the rotation of the servo-motor used to maintain the 100% signal level.

It will be appreciated that the embodiment of our invention illustrated by FIGURE 4 permits of the use of "combined" sources. From one known type of combined source, light is emitted simultaneously in two wavelengths e.g. cobalt and mercury. This is achieved by means of a suitable electrode system in the lamp. Notwithstanding the fact that the frequencies are emitted simultaneously, they can be discriminated, according to the arrangement of FIGURE 4, at the detector end of the apparatus. A similar situation obtains when, for example, light from a cobalt source is passed through a vessel containing mercury atoms which are excited by radiation from a mercury lamp placed at an angle to the cobalt source radiation. According to known physical principles, a proportion of radiation due to excitation of the mercury atoms will pass in the direction of cobalt-resonance radiation. Here, also then, is a "double source" whch can be used for the purposes of the apparatus of FIGURE 4.

Regardless of the type of measuring circuitry used, the fundamental technical principles remain unaffected and it is to be understood that our invention is wide enough to include any means whereby radiation samples from the sources are simultaneously or alternately passed through the atomic vapour and the transmitted intensity measured.

The following examples provide further illustrations of our invention:

Example 1

Use of continuous source for non-atomic absorption correction:

Monochromator, Bausch & Lomb grating-type spectral slit width 6A.
Resonance line source, mercury vapour lamp resonance line 2537 A.
Continuous source, hydrogen lamp.
Atomic vapour, mercury.
Non-atomic vapour, acetone.

Example 2

As for Example 1 but xylene was used as a non-atomic vapour.

Example 3

Use a non-resonance line source for non-atomic absorption correction:

Monochromator, Bausch & Lomb grating type spectral slit width 6A.
Resonance line source, mercury vapour lamp resonance line Hg 2536.5 A.
Line radiation source, Co 2536.0.
Atomic vapour, mercury.
Non-atomic vapour, acetone.

Example 4

As for Example 3 but xylene was used as non-atomic vapour.

Example 5

Atomic absorption measurements without non-atomic absorption correction:

Monochromator, Bausch & Lomb grating type spectral slit width 6A.
Resonance line source, mercury vapour lamp resonance line 2537 A.
Atomic vapour, mercury.
Non-atomic vapour, acetone.

Example 6

As for Example 5 but xylene was used as non-atomic vapour.

The amount of mercury was measured by a micrometer syringe which delivered 0.03 ml. and 0.04 ml. of 1 p.p.m. of a mercury sol to give 0.03 μg. and 0.04 μg. of mercury respectively. The mercury sol introduced into a small test tube was evaporated to dryness and then the organic solvent was added. The vapours were subsequently generated by heat and introduced into a 1 cm. diameter cell. The absorptions obtained are shown in Table 1.

TABLE 1.—EXPERIMENTAL RESULTS OF ATOMIC ABSORPTION (A.A.) IN PRESENCE OF NON-ATOMIC ABSORPTION (N.A.A.)

|  | Organic Vapour | Percent N.A.A. | Atomic Vapour Mercury, μg. | Percent A.A. |
|---|---|---|---|---|
| Example 1 | Acetone | 0 | 0.03 | 66 |
|  |  | 60 | 0.03 | 66 |
|  |  | 77 | 0.03 | 65 |
|  |  | 90 | 0.03 | 64 |
| Example 2 | Xylene | 0 | 0.10 | 94 |
|  |  | 83 | 0.10 | 93 |
|  |  | 0 | 0.04 | 76 |
|  |  | 94 | 0.04 | 75 |
| Example 3 | Acetone | 0 | 0.10 | 93.5 |
|  |  | 80 | 0.10 | 90 |
|  |  | 81 | 0.10 | 91.5 |
| Example 4 | Xylene | 0 | 0.04 | 76.5 |
|  |  | 94 | 0.04 | 76 |

It can be seen that the atomic absorptions were not affected by the presence of non-atomic absorbing substances. The same technique may be applied to other atomic and non-atomic species.

The examples were deliberately chosen to illustrate the efficiency of the technique even under such severe conditions as contamination of the atomic vapour by non-atomic substances to the extent of 94% absorption.

Examination of Table 1 clearly shows that neither the accuracy nor sensitivity of the atomic absorption method is affected by the correction technique.

Table 2 however illustrates the errors introduced into atomic absorption measurements if correction is not made for non-atomic absorption.

TABLE 2.—ATOMIC ABSORPTION IN PRESENCE OF NON-ATOMIC ABSORPTION WITHOUT CORRECTION

|  | Organic Vapour | Percent N.A.A. | Atomic Vapour Mercury μg. | Percent Absorption |
|---|---|---|---|---|
| Example 5 | 0 | 0 | 0.03 | 66 |
|  | Acetone | 77 | 0.03 | 80 |
|  | 0 | 0 | 0.04 | 76 |
|  | Xylene | 94 | 0.04 | 98 |
| Example 6 | 0 | 0 | 0.10 | 93.5 |
|  | Acetone | 80 | 0.10 | 98 |
|  | 0 | 0 | 0.04 | 76.5 |
|  | Xylene | 94 | 0.04 | 99 |

The application of the principle described above also makes possible the analytical determination of elements suitable for atomic absorption measurements at concentrations lower than would normally be considered possible, because the effect of fortuitous concentrations of non-atomic substances can be nullified. Such measurements are often necessary in the following applications:

(1) Biological analyses
(2) Geophysical and geochemical analyses
(3) Atmospheric analyses
(4) Organic analyses
(5) Analyses of substances which absorb in the vacuum ultraviolet
(6) Closed cell techniques.

The claims defining the invention are as follows:

1. Apparatus for determining the atomic absorption due to an element in a gaseous sample, said apparatus being characterised by a first source capable of emitting monochromatic light of frequency substantially equal to the resonance frequency of the element, a second source capable of emitting light having such a frequency distribution of energy that its total intensity within a detection frequency range is not sensibly attenuated by the atomic absorption and is attenuated by the non-atomic absorption to substantially the same extent as is the intensity of the light of the first source, the total intensities of the respective sources within the detection range being substantially equal, means for passing radiation from the source through the sample simultaneously or alternately according to a predetermined time schedule, and detecting means for comparing the intensities of the sources with that of the transmitted light and deriving therefrom a measure of the atomic absorption in the sample.

2. Apparatus as claimed in claim 1 characterised in that the light emitted by the second source represents a continuous band of frequencies over the spectral bandwidth of the detection range or over part thereof.

3. Apparatus as claimed in claim 2 characterised in that said band of frequencies represented by the second source includes the frequency of the first source.

4. Apparatus as claimed in claim 1 characterised in that the light emitted by the second source is monochromatic and of frequency differing from that of the first source.

5. Apparatus as claimed in claim 1 characterised in that the detecting means includes a monochromator capable of accepting frequencies over the detection range and of discriminating between the energy transmitted by the respective sources.

6. Apparatus as claimed in claim 5 characterised in that the detecting means further includes means for indicating the monochromator output due to the respective sources and for measuring this output as a percentage value and/or absorbance unit.

7. Apparatus as claimed in claim 1 characterised in that the light emitted by the second source is derived from a preliminary source from which light is passed through spectral broadening and filter means, said preliminary source being capable of emitting monochromatic light at the resonance frequency of the element, said spectral broadening means being capable of receiving light from the preliminary source and of transmitting to the filter means light representing a frequency range including the resonance frequency, said filter means including a zone having therein vapour of the element, thereby providing, as said second source, light from which the resonance frequency of the element has been substantially completely removed by absorption.

8. Apparatus as claimed in claim 7 characterised in that said first source has associated therewith a radiant energy generating chamber containing a quantity of the element, and means for irradiating the element in said chamber to cause re-radiation thereby at the atomic resonance frequency, said re-radiation constituting the light from the first source.

9. Apparatus as claimed in claim 8 characterised in that light transmitted by said filter means is directed through the radiant energy generating chamber prior to passing through the sample.

10. Apparatus as claimed in claim 9 characterised in that said broadening means includes a region having an inert gas therein affording a Lorentz spectral broadening of light passing therethrough.

11. A method of determining the atomic absorption due to an element in a gaseous sample, characterised by the steps of providing a first source capable of emitting monochromatic light of frequency substantially equal to the resonance frequency of the element, providing a second source capable of emitting light having such a frequency distribution of energy that its total intensity within a detection frequency range is not sensibly attenuated by the atomic absorption and is attenuated by the non-atomic absorption to substantially the same extent as is the intensity of the light of the first source, the total intensities of the respective sources within the detection range being substantially equal, passing the light from the said first and second sources through the gas sample according to a predetermined time schedule, detecting the light transmitted by the sample from the respective sources, comparing the intensities of the sources with that of the transmitted light of the sources, and deriving therefrom a measure of the atomic absorption, as distinguished from non-atomic absorption, in the sample.

12. A method as claimed in claim 11 characterised in that said time schedule is predetermined such as to cause the sample to be continuously irradiated from the first and second sources alternately, whereby an alternating current photoamplifier upon receiving light transmitted from the sample yields an A.C. signal of amplitude depending upon the amount of atomic absorption and being substantially independent of non-atomic absorption in said sample.

No references cited.

JAMES W. LAWRENCE, *Primary Examiner.*

W. J. SCHWARTZ, *Assistant Examiner.*